UNITED STATES PATENT OFFICE.

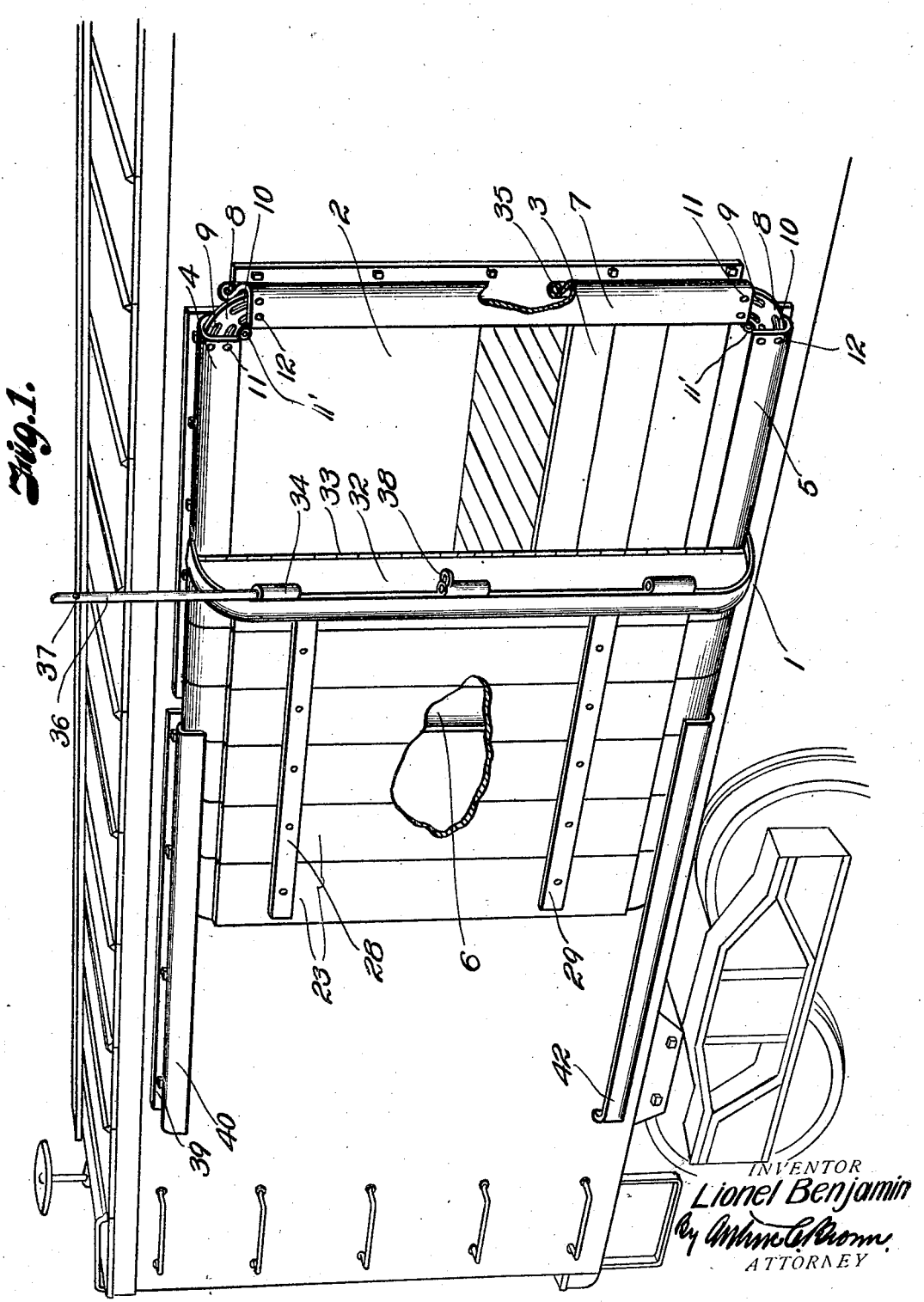

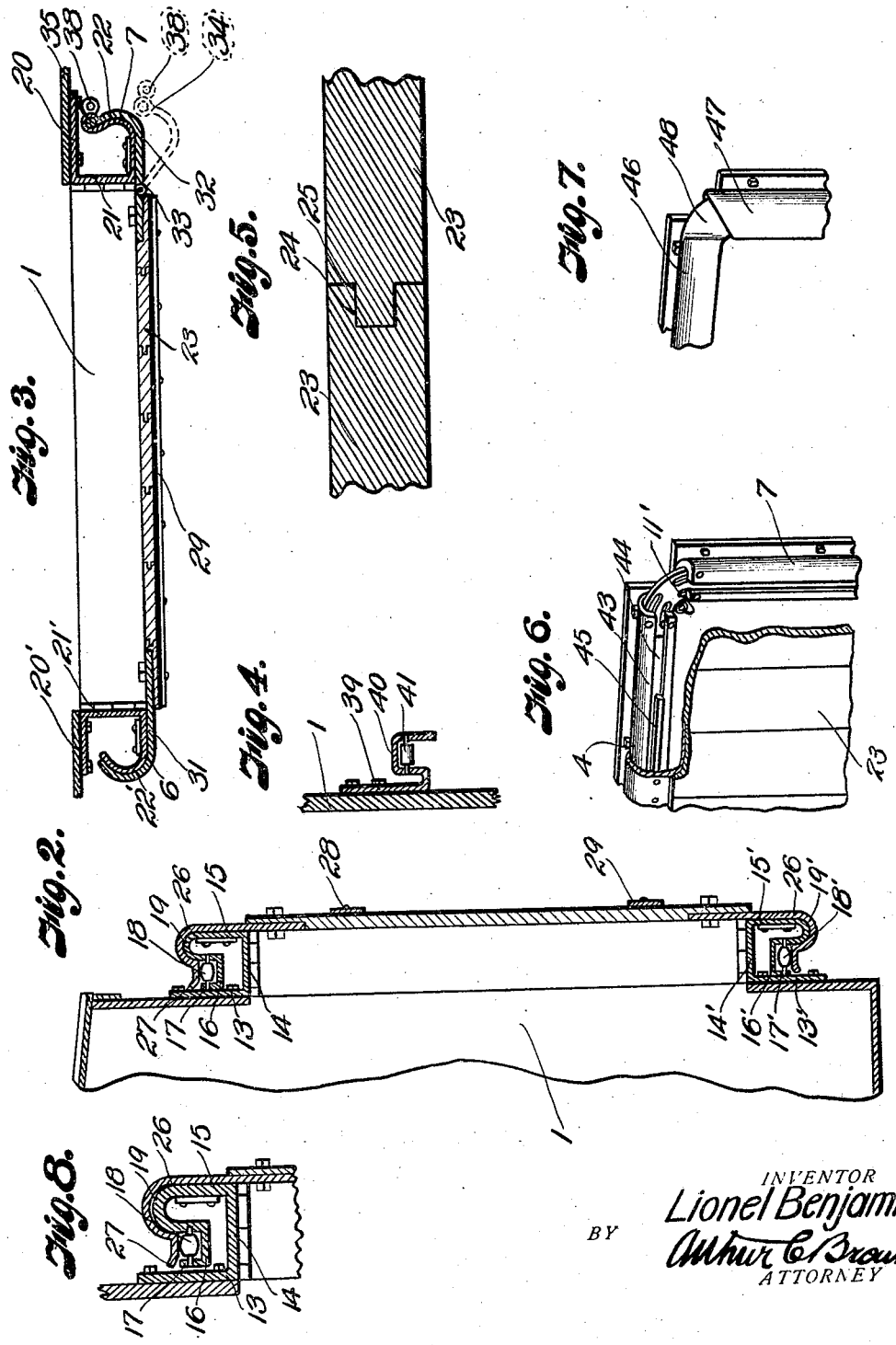

LIONEL BENJAMIN, OF KANSAS CITY, MISSOURI.

CLOSURE FOR CAR-DOOR OPENINGS.

1,413,702.　　　　　Specification of Letters Patent.　　Patented Apr. 25, 1922.

Application filed February 7, 1921. Serial No. 442,946.

*To all whom it may concern:*

Be it known that I, LIONEL BENJAMIN, a citizen of the United States, residing at Kansas City, in the county of Jackson and State of Missouri, have invented certain new and useful Improvements in Closures for Car-Door Openings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to sliding doors for closing openings, the invention being primarily intended for use in connection with freight car doors and particularly as a closure for a grain car door opening.

The invention is particularly applicable for use in connection with grain cars for the following reason:

There is of necessity considerable flexibility and twisting action in a box car due to the travel of the car over uneven road beds. If the car door does not provide a tight closure, there will be considerable loss of grain during transportation. This is caused in part at least by the fact that the ordinary grain car door and mounting are relatively rigid, causing the crevices between the door frame and the door to intermittently enlarge so that the grain escapes therethrough.

My invention contemplates the provision of means whereby the door frame, as well as the door which it carries, will have sufficient flexibility to enable the door, as well as the door frame, to flex with the car body while maintaining the integrity of the door closure.

In this manner the door closure will be sufficiently tight to prevent escape of grain.

The drawings illustrate the preferred forms of my invention, it being understood that changes in form, proportion and minor details of construction may be resorted to without departing from the spirit of the invention or sacrificing any of its advantages.

In the drawings,

Fig. 1 is a perspective view of part of a car to which my invention is applied.

Fig. 2 is a vertical, cross sectional view through the car door and its hanger.

Fig. 3 is a horizontal cross sectional view through the door and part of the car.

Fig. 4 is a sectional view through a guard rail.

Fig. 5 is a cross sectional view through the two mating car door sections.

Fig. 6 is a perspective view of part of a slightly modified form of car door and frame.

Fig. 7 is a fragmentary perspective view of a further modified construction of frame, and Fig. 8 is an enlarged section through one of the door hangers.

Referring now to the drawings by numerals of reference:

1 designates a box car to which my invention may be applied. The car is shown as provided with an opening 2, which may be partially closed by the boards 3. Surrounding the opening 2 and carried by the exterior of the car 1 is a flexible door frame adapted to flex with the car as it travels over the road bed. The door frame is shown as consisting of the top and bottom members 4 and 5 and the side members 6 and 7, connected by elbow connecting members consisting of plates 8 having arcuate slots 9 and 10 near their respective ends to be engaged by the fastening devices 11 and 12 so that the ends are flexibly connected to the sides and vice versa, there being hinges 11' connecting the inner edges of the side and bottom members 4 and 5 to edges of the side members 6 and 7. The top member 4 is shown as consisting of a plate 13 fastened to the side of the car by suitable fastening devices and provided with an outstanding web 14 having an upstanding flange 15 bent down and inwardly in the form of a trough 16, the flange 17 of which preferably lies against the plate 13.

The trough-shaped member carries anti-friction rollers 18, which are preferably elliptical, as shown in Fig. 2, the rollers being designed to support the car door to be hung on a hanger formed by the plate 13 and its appurtenances.

The bottom rail 5 is constructed substantially like the top rail 4. It is provided with a plate 13' having an outstanding extending web 14' with a downwardly disposed flange 15' bent up into trough shape, as indicated at 16', and having its flange 17' preferably lying against the plate 13'. The bent-over portions 19 and 19' constitute tracks upon which the hangers or grooved members of the door may ride or slide.

The end members 6 and 7 consist of plates 20 and 20' having outstanding webs 21 and 21', substantially the width of the webs 14 and 14' and they have outwardly curved flanges 22 and 22', as clearly seen in Fig. 3.

The door is supported upon the upper hanger and engages the lower hanger member, as will be apparent by reference to Figs. 1 and 2. The door may be of approved construction but is shown as consisting of a plurality of vertical slats 23, one edge of each slat having a groove 24 and the other a tongue 25 so that they may be secured together against warping but so that they will be permitted to slightly slide with respect to one another. The ends of the slats are curved over in the form of hooks 26, having flat edges 27, which rest upon the anti-friction bearings 18 and 18' so that the door may freely glide over the hangers without undue friction. The portions 19 and 19' prevent the door from moving outwardly away from the sides of the car since they snugly fit the hook-shaped portions 26, permitting the car door to move longitudinally with freedom but preventing lateral outward movement of the door, as will be apparent by reference to Figs. 2 and 8. The door members are connected by cleats or battens 28 and 29, there being one rivet in each batten for each member 23, so that they will be held in tongue and groove engagement but permit individual longitudinal movement of the members 23 when the car flexes or the frame which carries it flexes.

One edge of one of the longitudinal members 23 of the door is provided with a hooked-over edge 31 to engage the hooked-over end 22' of the member 6. At the opposite edge of the door is a hinged latch member 32, which is hinged to the end member 23, as at 33, and it is trough-shaped to fit over the curved-over flange 22 of the member 7. The hinged latch member 32 is provided with tubular extensions 34, which are adapted to align with the tubular members 35 on the member 7. The tubular members 34 and 35 alternate so that they may be fastened together by a vertical locking rod 36, which may pass alternately through them. The locking rod 36 is provided with an opening 37, which will be positioned adjacent to the seal lip 38 on one of the members 34. When the door is closed and the member 32 is in place with the locking rod in its locked position, a seal wire may be passed through the opening 37 and through the opening in the lip 38 and a seal attached thereto so that it will be impossible to open the door unless the seal is broken.

As an additional guard for the door, I may provide a rail 39, having a trough-shaped extension 40 with rollers 41 therein to rest upon the upper edge of the member 19 of the door, when open so as to maintain it in place and prevent undue vibration. A similar guard rail designated 42 may be placed at the bottom of the door (see Fig. 1) to support it.

Therefore, it will be seen that when the door is closed, the frame consisting of the members 4, 5, 6 and 7 will have inherent flexibility, enabling it to flex with the car as the car body vibrates in moving over the road bed; the door having a like flexibility, will conform to the flexing of the door frame so that all of the parts will be held snugly at all times irrespective of the warping of the car during transit and that a tight seal door closure will be provided.

In Fig. 6 I have shown a construction conforming to that shown in Fig. 1 in so far as the generic construction is concerned but I may groove or channel the top rail 43, as at 44, and provide the door with a rib 45 to slide in the channel. The other members of the door frame, corresponding to the members 5, 6 and 7, may also be channeled if desired.

In Fig. 7 I have shown one end member 46 and one side member 47 of a slightly modified form, which generically conforms to the construction described with respect to the preferred form except that instead of plates 8, I extend the end 48 of the top member into the trough-shaped side member 47.

The constructions shown in Figs. 6 and 7 are simply illustrative of different modifications of my invention, the preferred form, however, being that shown in Fig. 1.

By reference to Fig. 8 it will be observed that the flange 17 is spaced slightly from the plate 13. This is to allow for a limited sidewise movement or vibration. A similar construction may be provided for the lower hanger.

It will be seen from the foregoing that an efficient door closure will be provided, which may be easily attached to an existing type of car and one that is capable of maintaining the door opening closed, irrespective of the flexing of the car body when in use.

It is to be noted that the members 23 may be made of wood separate from the hooks 26, as shown, or the members 23 and the hooks 26 can be formed integral. Where the members 23 are of wood and the hooks 26 of metal, the members 23 will be long enough to overlap the top and bottom bars 4 and 5 when the door is closed.

What I claim and desire to secure by Letters-Patent is:

1. A flexible car door frame comprising horizontal top and bottom members and vertical end members, means for flexibly connecting the adjacent ends of the complementary members at the corners of the frame, and a flexible car door carried by said frame.

2. A flexible car door frame, and a flexible car door slidably carried thereon.

3. A rectangular car door frame having an inherent flexibility to permit it to flex with the car to which it is attached, and a flexible car door slidably supported by the frame.

4. A rectangular car door frame having an inherent flexibility to permit it to flex with the car to which it is attached, and a car door slidably supported by the frame, the car door also having inherent flexibility to flex with the frame.

5. A car door having inherent flexibility and consisting of connected, vertical sections, each section being capable of movement independent of the other sections.

6. A car door having inherent flexibility and consisting of connected, vertical sections, each section being capable of movement independent of the other sections, and each section having a tongue and groove connection with an adjacent section and provided with grooved ends to engage car door guides.

7. A car door frame having car door guides at top and bottom and side members flexibly connected thereto, a car door slidable on the top and bottom guides, and said car door having end members to overlap said side members.

8. A car door frame having car door guides at top and bottom and side members flexibly connected thereto, a car door slidable on the top and bottom guides, said car door having a hinged end member adapted to overlap one of said side members, and a locking device to secure the hinged member to the door frame.

9. A car door frame having end members and side members, elbows connecting the end members to the side members and lost motion connections between the elbows and the side members and end members.

10. A car door frame having top and bottom members and side members, the respective members being in channel form, means for flexibly connecting the ends of the complementary members, and a flexible car door carried by said frame.

In testimony whereof I affix my signature.

LIONEL BENJAMIN.